Patented May 15, 1945

2,375,957

UNITED STATES PATENT OFFICE 2,375,957

PROCESS FOR CONCENTRATING COLLOIDAL DISPERSIONS

Paul Stamberger, Philadelphia, Pa.

No Drawing. Application February 18, 1941, Serial No. 379,438. In Great Britain February 20, 1940

9 Claims. (Cl. 204—180)

Natural and artificial colloidal dispersions separate in two or more layers when subjected to the action of an electrical field between vertical membranes permeable to the current and impermeable to the colloid. The object of the present invention is to improve such a process of stratified separation or concentration or purification of colloidal dispersions between membranes permeable for the electric current and impermeable for the colloid.

It was found that the process of separation or concentration or purification of colloidal dispersions can be favorably influenced if to the colloid to be concentrated chemical compounds or substances of definite nature are added, the electrical charge of these additions being of the same sign as that of the colloid, and after addition they do not decrease the stability of the colloidal dispersion while under the influence of the electrical field. Since the electrical charge of the additional substances is of the same sign as that of the colloid which is retained by the membrane, neither the magnitude of the electrical charge of the particles is decreased nor is the stability of the dispersion while under the influence of the electrical field lowered. The additions furthermore do not influence the permeability of the membranes for the electrical current.

For carrying out the separation of colloids according to the present invention, it is of advantage that the electrical charge of the additional substances be higher than that of the colloid to be separated or concentrated. Such an addition increases the charge of the particles in the colloidal dispersion and therefore also the rate of separation. In such cases, to obtain the desired result a weaker electrical field can be applied, which has the advantage of improved economy and in elimination of the heating effect of the electrical current, which heating can cause disturbances.

Colloidal dispersions which could not be separated or concentrated by electrodecantation because of their instability i. e., tendency to coagulate, during the process of separation can be separated or concentrated after the addition of the substances referred to below, without difficulty.

The effective quantity of these additional substances is small and will not influence the properties of the final product.

It must be kept in mind that to obtain the desired results, to negatively charged dispersions only compounds which are also negatively charged and to positively charged dispersions only substances which are positively charged can be added. Furthermore it is important that the additions have no adverse effect on the stability of the colloidal dispersions to be separated.

For the present invention chemical compounds are also satisfactory which are not electrically charged when dispersed in water only but which will be charged in the ion-containing dispersion medium of the colloid. An example of such a compound is diethylene glycol stearate which in water dispersion will become negatively charged in an alkaline medium containing OH ions, as ammonia stabilized rubber latex.

For carrying out the present process it is therefore necessary to determine the electrical charge of the dispersed particles of the colloid to be separated by electrodecantation and add a product which does not decrease the electrical charge but may increase it and also improves the stability of the colloid during the process of separation. The best additions are compounds whose electrical charge is at least equal to the electrical charge of the colloid under separation.

The chemical compounds which will act in the manner described above are long chain molecules of dipolar nature containing six or more groups of atoms in a chain which does not show affinity to water, that is, of hydrophobic nature, and which are in chemical combination with at least one radical which has affinity to water and has the tendency to form water solutions. A water insoluble chain is for example a hydrocarbon chain. Water soluble radicals are for example carboxyl, hydroxyl and amino radicals.

The best effect was obtained with products having radicals distributed asymmetrically in the molecule; these molecules will orient during the process of separation by electrodecantation when an electrical field is applied, since these molecules have the properties of dipoles. Furthermore it is of advantage when there are positive and negative radicals in the molecule, which dissociate into ions when dissolved in water.

These chemical compounds can be water soluble or self emulsifying, according to their chemical nature and balance of soluble and insoluble atomic groups in the molecule.

Examples of water soluble substances are: ammonium sorbitol-borate, sodium monobutyldiphenylsulfonate, etc.

Self emulsifying compounds are for example: diethylene glycol stearate, sorbitol monolaurate, propylene glycol stearate, alkali salts of long chain fatty acids, triethanolamine stearate, glycerol monostearate, etc.

Some of the compounds mentioned above will dissociate into positive and negative ions in water. The soluble salts of long chain fatty acids will dissociate into a negatively charged fatty acid residue and a positively charged metal ion. The fatty acid part of the molecule will form a colloidal electrolyte, because of the tendency of association at lower temperatures.

By operating in accordance with the present invention compounds can also be used which will not show dissociation in water. These compounds have one or more hydrophilic radicals attached to the water insoluble part of the molecule, for example glycerol monostearate or sorbitol monostearate, where the hydroxy radicals have affinity to the water and the hydrocarbon remainder of the fatty acid is insoluble. These compounds will only be electrically charged when ions can be adsorbed from a water solution.

To disperse the above mentioned group of compounds in water and to obtain in this manner a colloidal dispersion, no emulsifying agent or mechanical dispersing equipment, as a colloid mill, is necessary. Simple stirring in a given quantity of water above the melting point of these compounds is sufficient to obtain the colloidal dispersion. The presence of ions, as OH ions in alkaline water, will greatly facilitate this process of dispersion. A dilute dispersion of the above compounds can be separated by electrodecantation in very short time. These compounds when added to the colloid to be separated will not increase appreciably the specific conductance of the colloidal dispersion.

Frequently the combination of two or more of the chemical compounds will give the best results. An effective combination is for example a soluble salt of a fatty acid as ammonium stearate and diethylene glycol oleate.

The quantities needed to improve the rate of separation, to make the separation more complete and to improve the stability of the concentrated layer which forms on the membrane, are small. They do not increase the conductivity of the colloid appreciably but will prevent the formation of a coagulated layer on the membranes, which would form under similar conditions in the absence of the above compounds. This formation of coagulated layer on the membrane has to be prevented not only because of loss in the colloid which is irreversibly coagulated on the membrane under separation or concentration, but also because membrane covered by a coagulum loses its effectiveness. When more concentrated dispersions are further concentrated by electrodecantation the viscosity of the layer formed on the membrane during electrodecantation is high and this layer has a tendency to stick to the membrane and will coagulate when subjected continuously to the action of the electrical field. In such a case periodic reversal of the direction of flow of electrical current will overcome this difficulty. When the direction of flow of current is reversed the layer formed on the membrane will move away from the membrane and raise or fall in the cell according to the effect of the force of gravity.

When artificially prepared colloidal dispersions have to be concentrated by electrodecantation the chemical compounds which are the subject of the present invention can be added during the process of dispersion.

The action of the substances referred to above is illustrated by the following examples:

The process of separation was carried out in a round electrodialyzing apparatus of 14 cm. diameter. The distance between the membranes was 2 cm. The compartments with the colloid were separated from each other and from the compartment with the electrodes by membranes.

Example 1.—The colloid used was fresh cow's milk. Three cells were filled. The first cell contained 300 cc. of milk to which no addition was made. The second cell contained a solution of 1.5 grams of mannitol monolaurate in 300 cc. of milk, and the third cell a solution of 1.5 grams of diethylene glycol oleate in 300 cc. of milk. The electrode cells were filled with a N/5 sodium phosphate solution.

A potential gradient of 1.5 volt per cm. was applied for two hours after which the cream layer on the top of the cells separated completely. The heights of the cream layers were, in the first cell 2 cm., in the second 4 cm., and in the third 3½ cm. The solid content of the cream layers were 29% in the first, 35% in the second and 37% in the third cell.

Example 2.—The colloid used was an artificial dispersion of 2-chlorobutadiene 1-3 in polymerized state, known under the trade name "Neoprene." The concentration of the dispersion to be separated was 50%. 300 cc. of the dispersion were placed in the cells. To the content of the first cell no addition was made. To the content of the second cell 0.6 gram of ammonium mannitolborate was added and to the content of the third cell 0.6 gram of diethylene glycol oleate, to the fourth cell 0.6 gram triethanolamine linoleate. A potential gradient of 0.3 volt per cm. was applied and the direction of flow of the electrical current was reversed every thirty minutes. After 12 hours the layers were examined, and the cell was opened. The membranes in the first cell were covered with a coagulated deposit and the membranes of all the other cells were free from deposit. The solid content of the separated layers were: First cell 57%, second cell 56%, third cell 59.5%, fourth cell 59%.

Example 3.—When a natural dispersion of rubber was used instead of Neoprene the same behavior was observed. The membranes of the cell filled with the natural product (rubber latex) without any addition were covered by a deposit, and the membranes of the cells filled with the dispersion to which the following additions were made, were free of all deposits: sorbitol monolaurate, triethanolamine stearate, sodium sulforicinoleate, ammonium mannitolborate, diethylene glycol oleate, propylene glycol oleate.

The amounts added were 0.2%. The cells were operating for 24 hours with a potential gradient of 0.3 volt per cm. and the current was reversed every 30 minutes. The solid content of the dispersion was 30% before separation.

I claim:

1. In the art of electrodecantation of an irreversibly coagulable aqueous colloidal dispersion in a cell having a membrane impervious to the coloidal particles and at a potential which would form a coagulated layer on the membrane, the improvement which comprises inhibiting formation of an irreversibly adhering deposit on the membrane by dispersing in said dispersion a compound which includes a hydrophilic portion and a hydrophobic portion having a carbon chain of at least 6 atoms, of which, when the compound is dispersed in said dispersion, the part containing said hydrophobic portion assumes a charge of the same sign as that of the colloidal particles being electrodecanted, whereby accumulation of the colloidal particles on the membrane does not decrease the effectiveness of the membrane.

2. A process according to claim 1 in which said compound is capable of dissociation into ionized portions.

3. A process according to claim 1 in which said compound is water soluble.

4. A process according to claim 1 in which said compound is a self-emulsifying ester of an organic acid having a carbon chain of at least 6 atoms.

5. A process according to claim 1 in which the dispersed particles of the dispersion being electrodecanted have a negative charge and in which said compound is a salt of a long-chain fatty acid.

6. A process according to claim 1 in which the dispersed particles of the dispersion being electrodecanted have a negative charge and in which said compound is a salt of stearic acid.

7. A process according to claim 1 in which the dispersion subjected to electrodecantation is a dispersion of natural rubber.

8. A process according to claim 1 in which the dispersion subjected to electrodecantation is a dispersion of synthetic rubber.

9. A process according to claim 1 in which the dispersion subjected to electrodecantation is an artificially prepared dispersion and in which said compound is dispersed in said dispersion during the preparation thereof.

PAUL STAMBERGER.